United States Patent

Naumann et al.

[11] Patent Number: 5,927,167
[45] Date of Patent: Jul. 27, 1999

[54] APPARATUS FOR TRUING WHEELSETS

[75] Inventors: Hans J. Naumann, Albany, N.Y.; Reinhard Robotta, Erlau, Germany; Gunter Schroter; Wolfgang Gerhard, both of Chemnitz, Germany

[73] Assignee: NILES SIMMONS Industrieanlagen GmbH, Chemnitz, Germany

[21] Appl. No.: 08/838,941

[22] Filed: Apr. 23, 1997

Related U.S. Application Data

[63] Continuation-in-part of application No. 08/453,364, May 30, 1995, abandoned.

[30] Foreign Application Priority Data

May 30, 1994 [DE] Germany .............................. 44 18 823

[51] Int. Cl.$^6$ ..................................................... B23B 1/00
[52] U.S. Cl. ............................... 82/1.11; 82/104; 82/118; 409/165; 29/27 C
[58] Field of Search .......................... 82/1.11, 101, 105, 82/104, 118, 120, 113; 407/34, 51, 53, 54, 61, 119; 409/165, 166, 199; 29/27 C, 27 R, 33.52

[56] References Cited

U.S. PATENT DOCUMENTS

| 3,577,809 | 5/1971 | Brandl ................................ 409/232 X |
| 3,699,828 | 10/1972 | Piatek et al. .............................. 82/113 |
| 4,200,012 | 4/1980 | Wittkopp et al. ...................... 82/104 X |
| 4,347,769 | 9/1982 | Dombrowski et al. .................... 82/104 |
| 4,784,023 | 11/1988 | Dennis ................................ 407/119 X |
| 5,007,151 | 4/1991 | Gusching ............................ 29/27 C X |
| 5,105,691 | 4/1992 | Brinkmann et al. ................. 409/165 X |

FOREIGN PATENT DOCUMENTS 000528058 2/1993 European Pat. Off. ................. 82/104

Primary Examiner—Andrea L. Pitts
Assistant Examiner—Henry W. H. Tsai
Attorney, Agent, or Firm—Howard J. Greenwald

[57] ABSTRACT

An apparatus for profiling a wheelset comprised of a milling cutter with a first axis of rotation, driven friction rollers for rotating the wheelset about a second axis of rotation, and computer numerical control apparatus for rotating the milling cutter about its first axis of rotation while disposing it so that the first axis of rotation is substantially perpendicular to the second axis of rotation.

14 Claims, 5 Drawing Sheets

APPARATUS FOR TRUING WHEELSETS

CROSS-REFERENCE TO RELATED PATENT APPLICATIONS

This application is a continuation-in-part of applicants' patent application Ser. No. 08/453,364, filed May 30, 1995, now abandoned which latter application claimed priority based upon prior German patent P 4418823.4-14 entitled "Wheelset truing process and wheelset truing machine" which was filed in the German Patent Office on May 30, 1994.

FIELD OF THE INVENTION

An apparatus for profiling a railway wheel or wheelset which contains a milling cutter and a wheel or wheelset rotated by driven friction rollers. The milling cutter is rotated about an axis which is substantially perpendicular to the axis of rotation of the wheel or wheelset.

BACKGROUND OF THE INVENTION

During operation the wheels of railroad rolling stock (such as locomotives and railroad cars) become worn. This ear often increases the risk of train derailment and, additionally, may accelerate wheel wear or otherwise adversely affect the running characteristics of the wheels.

These wheels of railroad rolling stock may, with wear, develop flat areas on their circumferences. Such wear often causes a bumpy or vibratory rotation of the worn wheel against the rail. Additionally, such worn wheels may cause derailment of the railway vehicle.

It is thus critical to maintain railway wheelsets to attempt to avoid this condition and, where it occurs, to grind or machine the wheel's circumference so that it is once more perfectly round and concentric with the axial centerline of the wheel and the wheelset. Railway wheelset truing machines are often used for this purpose.

Railway wheelsets may be trued with milling machines, which are adapted to remove metal by feeding a workpiece through the periphery of a rotating circular cutter, such as a milling cutter.

By way of illustration of milling machines suitable for truing railway wheel sets, U.S. Pat. No. 3,540,103 of Oliver Saari (the disclosure of which is hereby incorporated by reference into this specification) discloses a milling cutter for truing wheels of railroad cars and locomotives. The milling cutter of this patent comprises a body of substantially circular cross-section and a plurality of center buttons rigidly associated with the surface of the body, the buttons being arranged in a plurality of spaced ranks to establish a helical array of buttons about the surface of the body, wherein the buttons are spaced within such ranks that buttons which are adjacent in the helical array lie in non-adjacent ranks. A similar cutter is disclosed in U.S. Pat. No. 2,645,003, the disclosure of which is also hereby incorporated by reference into this specification.

The milling cutter of U.S. Pat. No. 3,540,103, and similar prior art milling cutters, are generally disposed vis-a-vis the wheel set to be trued so that the axis of the milling cutter is substantially parallel to the axis of the wheelset during the milling operation, which is often referred to as an "axially parallel circumferential profile milling" process.

Axially parallel circumferential profile milling processes generally require separate profile cutters for each profile shape. Thus, when one must machine different profile shapes, the milling cutter must frequently be changed.

It is an object of this invention to provide a wheelset truing machine which is adapted to true any wheel profile with only one milling cutter.

It is another object of this invention to provide a wheelset truing machine with a high stock removal rate and an improved chip break rate.

It is yet another object of this invention to provide an improved underfloor wheel set truing machine.

SUMMARY OF THE INVENTION

In accordance with this invention, there is provided an apparatus for profiling a wheelset comprised of a milling cutter with a first axis of rotation, driven friction rollers for rotating the wheelset about a second axis of rotation, and computer numerical control means for rotating the milling cutter about its first axis of rotation while disposing it so that the first axis of rotation is substantially perpendicular to the second axis of rotation.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
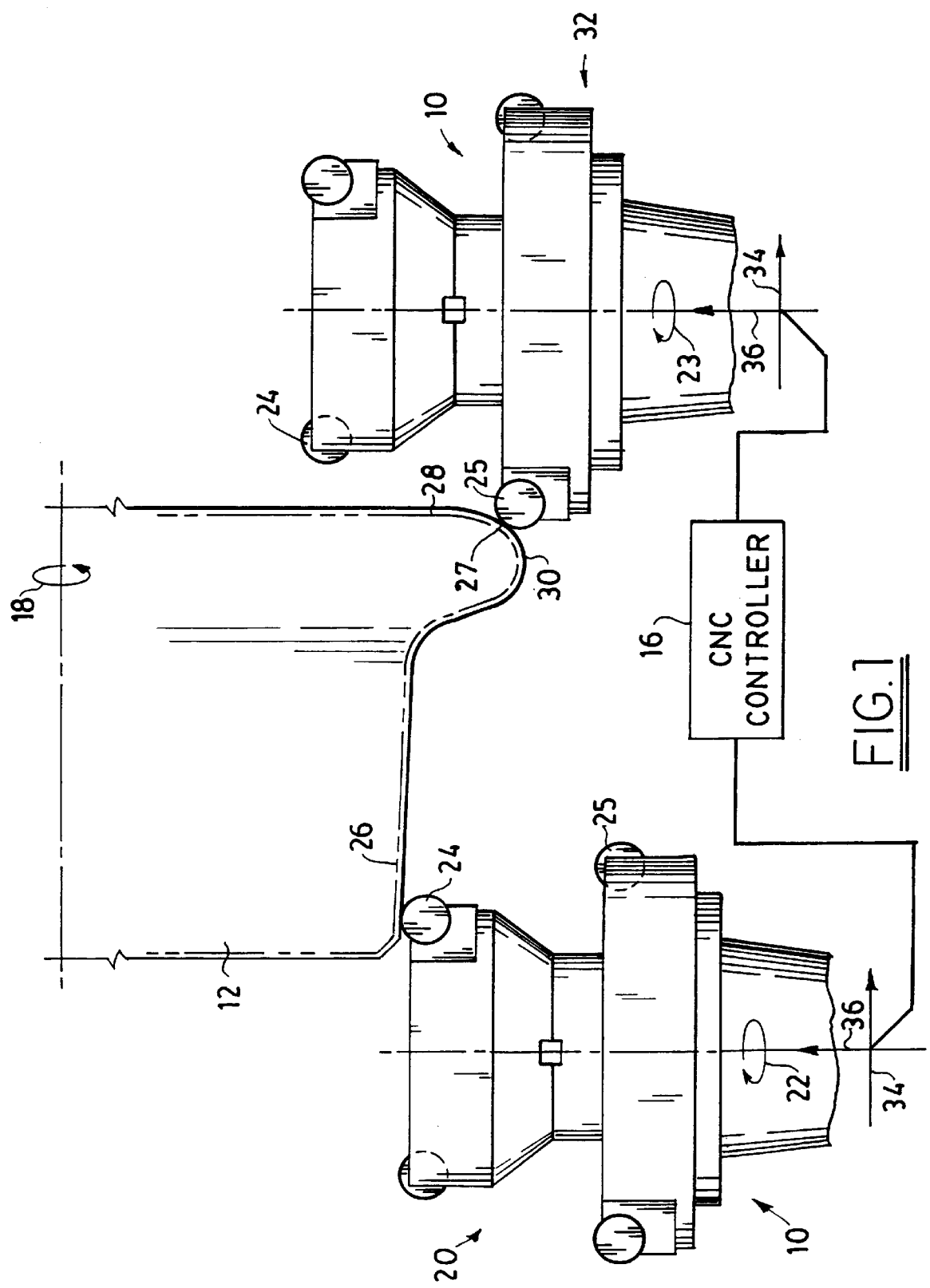
FIG. 1 is a schematic view of one preferred embodiment of the invention.

FIG. 1 is a schematic view of one embodiment in which a milling cutter 10 is utilized to true wheel 12.

The milling cutter 10 preferably used in this invention is adapted to be used in a mill-turning process. Mill-turning is a stock-removal process in which the principles of turning and milling have been combined so that rotationally symmetrical faces are generally obtained.

The workpiece, such as wheel or wheelset 12, is driven through an axis of rotation for generating the principal feed motion. A milling cutter is generally provided with an integral drive for generating the principal feed motion. One may dispose the position of the tool axis with respect to the workpiece axis to effect axially parallel mill-turning (where the cutter axis and the workpiece axis run substantially in parallel). It is preferred, however, to conduct axially perpendicular mill-turning (where the cutter axis runs substantially perpendicularly to the workpiece axis).

The milling cutter 10 is adapted to effect "continuous-path profile mill-turning" which involves a mill-turning process for generating a rotationally symmetrical workpiece profile by controlled feed motion. In this process, the profile of the cutter does not comply with the shape of the workpiece profile generated.

The apparatus of this invention is comprised of a milling cutter, such as, e.g., the milling cutter 10 depicted in FIG. 1. The term milling cutter, as used in this specification, refers to a rotary, steel-cutting tool with peripheral teeth which is used in a milling machine to remove material from a workpiece (such as a wheel or wheelset) through the relative motion of the workpiece and the cutter. Thus, by way of illustration, milling cutters are disclosed in U.S. Pat. No. 5,388,932 (cutting insert for milling cutter), U.S. Pat. Nos. 5,383,750, 5,382,118, 5,332,238, 5,292,212, 5,285,600, 5,240,359, 5,236,288, 5,232,319, 5,228,459 (rotating milling cutter), U.S. Pat. Nos. 5,207,538, 5,199,827 (insert for a milling cutter), U.S. Pat. Nos. 5,158,402, 5,145,295, 5,145,294, 5,123,786, 5,102,268, 5,094,575, 5,071,291 (internal disk milling cutter), U.S. Pat. No. 5,052,864 (counterbore milling cutter), U.S. Pat. No. 4,995,767 (face milling cutter), U.S. Pat. Nos. 4,993,891, 4,993,890, 4,991,986, 4,990,035 (contour milling cutter), U.S. Pat. No. 4,966,500 (face milling cutter), U.S. Pat. Nos. 4,946,318, 4,940,369, 4,938, 638, 4,930,949 (thread milling cutter), U.S. Pat. Nos. 4,907, 9200, 4,904,129 (annular milling cutter), U.S. Pat. Nos. 4,881,585, 4,848,978, 4,843,709 (shell-type milling cutter), U.S. Pat. No. 4,826,363 (face milling cutter), U.S. Pat. Nos. 4,810,136, 4,799,8380, 4,789,273, 4,765,783 (face milling cutter), U.S. Pat. Nos. 4,733,995, 4,729,697, 4,728,228, 4,718,731 (slotted wall milling cutter), U.S. Pat. No. 4,701, 084 (shell-type milling cutter), U.S. Pat. No. 4,694,915 (slotted wall milling cutter), U.S. Pat. Nos. 4,684,297, 4,660,262, 4,652,182, 4,645,383 (end milling cutter), U.S. Pat. Nos. 4,627,771, 4,566,828 (ball track milling cutter), U.S. Pat. No. 4,547,100 (adjustable milling cutter), U.S. Pat. Nos. 4,519,731, 4,505,627 (polygon box tool milling cutter), U.S. Pat. No. 4,488,839 (internal disk milling cutter), U.S. Pat. No. 4,285,618 (rotary milling cutter), U.S. Pat. No. 4,275,528 (electroplated diamond milling cutter), U.S. Pat. No. 4,219,292 (rotary helical milling cutter), U.S. Pat. No. 4,201,500 (profile milling cutter), U.S. Pat. Nos. 4,197,039, 4,174,915 (contour milling cutter), 4,093,391 (milling cutter head), U.S. Pat. No. 4,033,018 (indexable milling cutter), U.S. Pat. No. 3,837,059 (profile milling cutter), U.S. Pat. No. 3,820,849 (milling cutter head), U.S. Pat. No. 3,762,007 (rotary hollow milling cutter), U.S. Pat. No. 3,678,554 (profile flat tooth milling cutter), U.S. Pat. Nos. 3,675,290, 3,672,017 (helical blade milling cutter), and the like. The disclosure of each of these United States patents is hereby incorporated by reference into this specification.

The milling cutter of this invention is preferably used for truing the wheelset of a railway vehicle. The term wheelset, as used herein, refers to workpiece such as a wheel or wheelset and includes, e.g., a single-wheel suspension in a truck. Thus, e.g., the device of this invention may be used with the workpieces disclosed in U.S. Pat. No. 5,349,862 (railway wheelset), U.S. Pat. No. 5,335,602 (two wheelset units containing a drive unit and a brake unit), U.S. Pat. No. 5,282,425 (a steerable truck with a pair of wheelsets supporting a pair of laterally spaced side frames), U.S. Pat. No. 5,263,420 (three driven wheelsets elastically supported in a frame), U.S. Pat. No. 5,044,458 (selectively engageable wheelset), U.S. Pat. No. 4,895,408 (truck wheelset), U.S. Pat. No. 4,802,418 (wheelset steering apparatus), U.S. Pat. Nos. 4,674,370, 4,445,439 (railroad vehicle truck with single wheelset), U.S. Pat. Nos. 4,445,439, 4,444,121, 4,424,750, 4,230,043, and the like. The disclosure of each of these United States patents is hereby incorporated by reference into this specification.

One typical wheelset which may be trued by the apparatus of this invention is disclosed in U.S. Pat. No. 4,033,209 of Theodor Dombrowski, the disclosure of which is hereby incorporated by reference into this specification. Referring to U.S. Pat. No. 4,033,209, and to FIGS. 1, 3, and 4 thereof, wheel set 20 has a shaft 23 and two wheels 25 and 26 fixedly connected to the shaft for rotation therewith. Each of wheels 25 and 26, in this embodiment, has a similar profile; for the sake of simplicity, the original profile of wheel 25 will be described.

Figure 4:
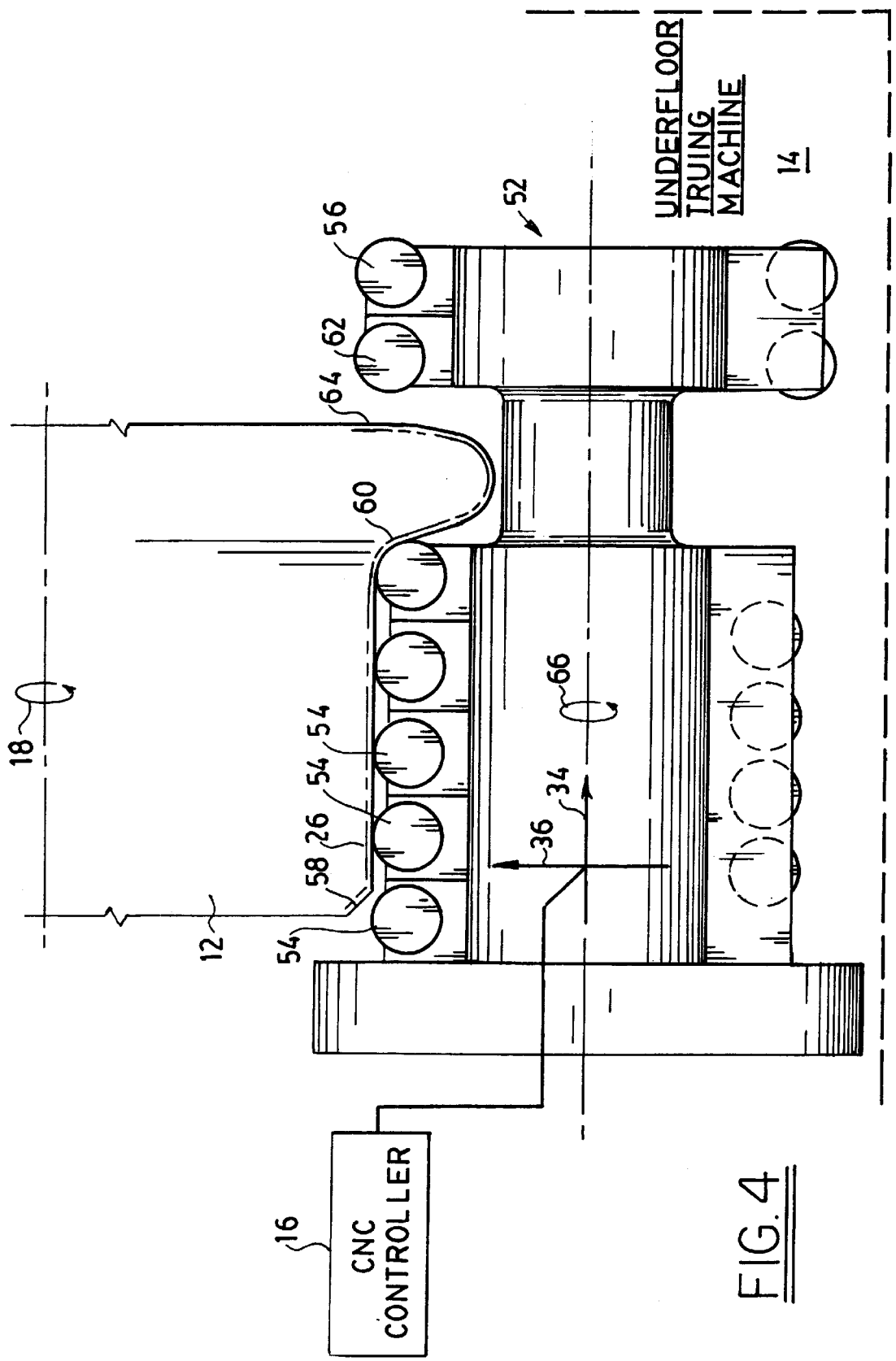
FIG. 4 is a schematic view of yet another preferred embodiment of the invention.

Referring to FIG. 4 of U.S. Pat. No. 4,033,209, the profile 53 of the wheel 25 of Figure has the following successive zones: the wheel back 55, the wheel rim 56, the wheel rim fillet 57 with the center point 61, the tread surface 58, the chamfer 59, and the wheel front 60. The tread surface 58 is, in the section 63, inclined with a relatively small angle 64 relative to a horizontal line 65, whereas the outwardly adjoining section 67 has a greater angle 68 with respect to the horizontal line 65.

The wheel profile of U.S. Pat. No. 4,033,209, and the wheel profile depicted in FIG. 1 of this application, are not necessarily identical. The advantage of the apparatus and process of this invention is that, with only one milling cutter, both of these wheel profiles (and other wheel profiles) may be readily trued.

In one embodiment, shown schematically in FIG. 4, the milling cutter of this invention is utilized in an underfloor wheelset truing machine 14. One may utilize some or all of the structures of the underfloor wheelset truing machines of the prior art in the apparatus of this invention. Some of these underfloor wheelset truing devices are described below.

U.S. Pat. No. 4,033,209 of Theodor Dombrowski discloses an underfloor truing machine for remachining worn wheel profiles of a wheel set in a continuous operation, in which each wheel has a wheel rim at an inner end thereof. The machine includes a pair of rolls for supporting each wheel of the wheel set, the rolls of each pair of rolls being arranged spaced from each other substantially in a plane normal to the axis of the wheel set. The machine also includes a turning tool for machining the profile of each wheel arranged between the rolls of each pair of rolls, wherein each roll has a peripheral surface provided with an axially extending carrying zone and axially extending transfer zone following the carrying zone in a direction toward the center plane of the wheel set and being inclined with respect to a horizontal line at an angle greater than the inclination of the desired profile to be machined into a portion of the wheel opposite the transfer zone. The angle included between the transfer zone and the horizontal line is such that the radial distance between a point at an axial end of an active surface portion of the transfer zone facing the rim of the wheel in a plane including the wheel set axis and the roll axis from the opposite point of the desired wheel profile in said plane is equal to the maximum depth of a cut produced by the turning tool during one revolution of the wheel. The disclosure of this patent is hereby incorporated by reference into this specification.

U.S. Pat. No. 4,134,324 of Max Luzina describes a method for reprofiling the wheels of railroad wheel sets by the simultaneous machining of the wheel profiles, formed by the tread and the flange surface of the wheels of a wheelset, on a below-floor turning machine, wherein each wheel is frictionally driven at the profile by two rollers which are arranged at a mutual spacing and receive the wheel. The disclosure of this patent is hereby incorporated by reference into this specification.

U.S. Pat. No. 4,276,793 of Arthur T. Wirtz discloses an apparatus for truing metal wheels of railroad locomotives and other rolling stock which has a traction motor for driving locomotive wheels to be trued, wherein said apparatus is disposed in and about an open pit having removable rail sections extending thereover for supporting said locomotive and which includes means for lifting the locomotive from the rails. The device of this patent contains a means for removing the rail sections to provide access to the wheels from the pit, means for driven the wheels to be trued at a controlled speed through the traction motor independently of the locomotive, means for cutting metal from the wheels, and means for controlling the cutting means to cut metal in a contour corresponding to a predetermined pattern. The disclosure of this patent is hereby incorporated by reference into this specification.

U.S. Pat. No. 4,347,769 of Theodor Dombrowski et al. discloses an underfloor wheelset turning machine for the profiling of wheelsets of vehicles which run on rails roll carrier means mounted for horizontal and vertical movement, a spaced pair of rollers mounted on said carrier means, said rollers being positioned to contact at least the tread of a wheel of a wheelset disposed in said machine, and at least partially supporting the weight thereof, drive means connected to at least one of said rollers for driving said wheel, and horizontally acting brake means operatively connected to said carrier means for yieldably resisting horizontal movement of said carrier means in a plane perpendicular to the axis of said wheel.

U.S. Pat. No. 4,669,292 of Dirk Brinkman et al. discloses an underfloor wheel set barring machine for retreading the wheel rim circumference of railroad wheel sets. The machine of this patent contains two driven pairs of friction rollers, each of which can be pressed against a wheel rim circumference of a wheel set, with the friction rollers of each pair of friction rollers being arranged for single pivoting around a pivoting axis which is parallel to the axis of the wheel set. The machine also contains two rotary drive means, each of which drives a pair of the friction rollers and comprises a drive motor, a first smooth belt drive, a second smooth belt drive having a common drive wheel driven by said motor, each belt drive having an output wheel driving an input gear of a spur gear system, each spur gear system having an output member connected to one of said pair of friction rollers, the output wheel of each belt drive being coaxially arranged with the pivoting axis of the associated friction roller. The disclosure of this patent is hereby incorporated by reference into this specification.

U.S. Pat. No. 4,674,370 of Uwe Gutohrlein et al. discloses an underfloor wheelset turning machine for reprofiling the wheel tire contours of railway wheelset which contains two driven friction roller pairs, each adapted to be pressed against a wheel tire contour of a wheelset, the friction rollers of each friction roller pair being individually connected in each case to a pivot drive and each pivotal about a pivot axis arranged parallel to the wheelset axis. In this device, each pivot drive comprises a pneumatic bellows cylinder for producing the pivot movement, and two pivot drives associated with a friction roller pair are coupled to a synchronizing means.

U.S. Pat. No. 4,825,737 of Alfred Heimann et al. discloses a mechanism for lifting a wheel set into or out of machining position. In order to facilitate the chip removal, the lifting mechanism is tiltably mounted in a chip removal pit. In its uplifting working position of cover of the lifting mechanism substantially closes the chip pit except for the wheel carriers. In the recessed position of the lifting mechanism the cover tilts along with the lifting mechanism thereby guiding any chips accumulated on the cover onto a chip removing conveyor in the pit. For this purpose, the lifting mechanism has a movable frame hinged to a stationary frame so that the hinging axis extends outside of a lifting plane passing through the rotation axis of the wheel set. The disclosure of this patent is hereby incorporated by reference into this specification.

Underfloor turning machines for wheel sets are also disclosed in German patents numbers 1,043,020 and 1,082,478; the disclosure of each of these patents is hereby incorporated by reference into this specification. In the machines described in these patents, each wheel of the wheel set is driven by two friction rolls engaging the tread surface of the respective wheel. The cutting operation during the reprofiling of the wheel profiles in these machines has to be interrupted and the friction rolls have to be transposed.

Polish patent number 78,173, the disclosure of which is hereby incorporated by reference into this specification, discloses an underfloor milling machine which contains first roller means arranged for contacting the circumference of a wheel of a wheel set, and second roller means arranged for contacting the inwardly facing surface of the wheels of the wheelset. In the device of this patent, at least the circumference contacting roller means drive the wheels of a set, and the inwardly facing surface contacting rollers provide an alignment and guidance in the axial direction of the wheel set.

In one preferred embodiment of the invention, illustrated in FIG. 1, the milling cutter 10 is operatively connected to a CNC (computer numerically controlled) controller 14, which effects biaxial (axial and radial) CNC axially parallel or axially perpendicular profile mill-turning, utilizing at least one milling cutter preferably equipped with at least two edge crowns with opposite sense of rotation and cutting (for axially perpendicular profile milling), thereby preferably generating a first wheel profile area for machining the wheel profile area by means of a first edge crown, as well as another wheel profile range or residual wheel profile range by means of a second edge crown with approximately equal direction of chip fly.

Figure 2:
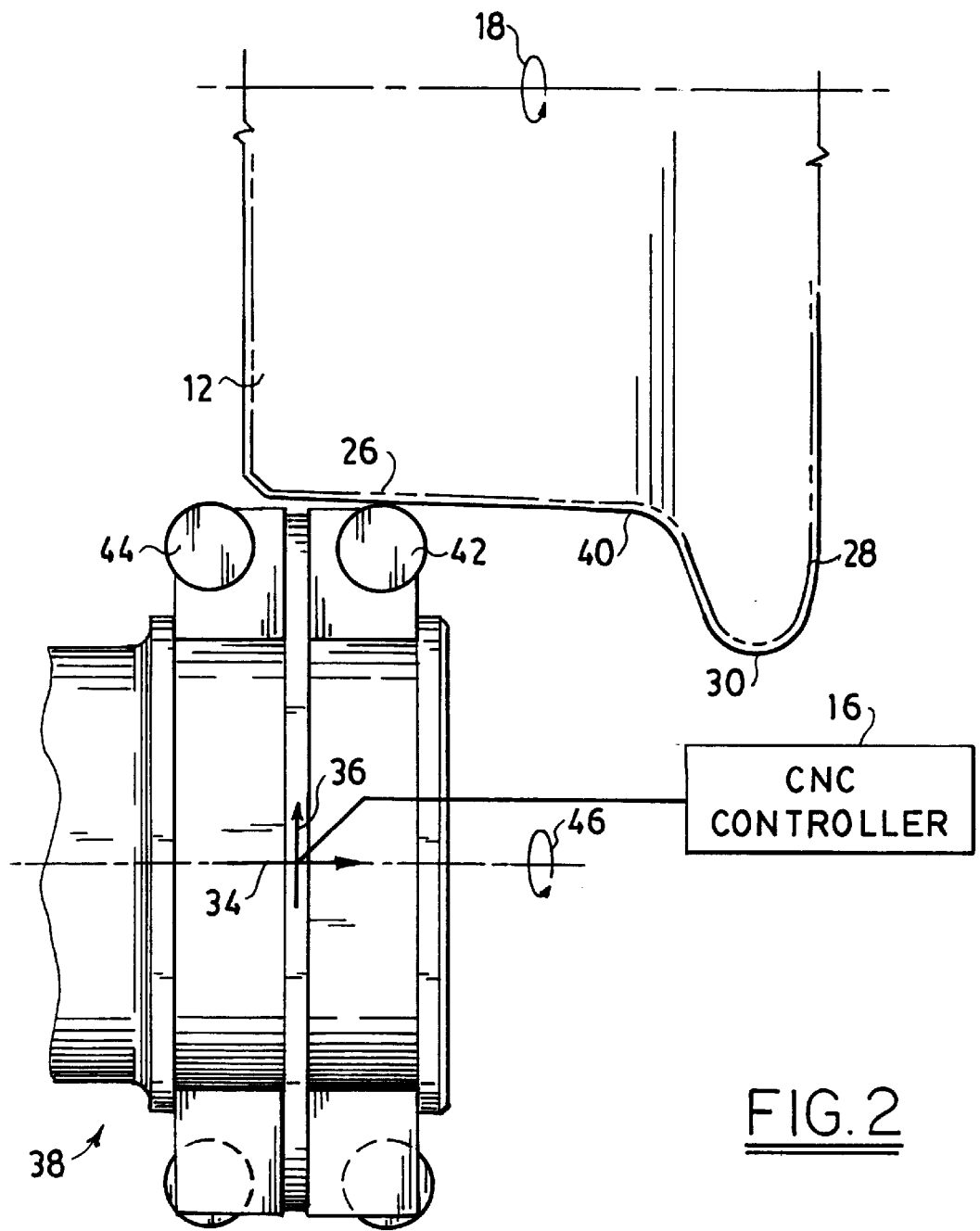
FIG. 2 is a schematic view of another preferred embodiment of the invention.

In the embodiment illustrated in FIGS. 2 and 4, the axes of rotation 46 and 66 are substantially parallel to axis of rotation 18.

When the apparatus of this invention is used so that the axis of rotation of the milling cutter(s) 10 is arranged approximately perpendicularly to the axis of rotation of the wheelset (with a preferred eccentricity of about 0), one may use tools with smaller diameters, thereby allowing the use of moderately price cutters. In this preferred embodiment, several edges are simultaneously in action with a small cutting depth; and there is a relatively smooth approach and exit of the cutting tips.

In another embodiment of the invention, the axis of rotation of the milling cutter is arranged approximately perpendicularly to the profile slant of relevant portions of the wheel profile, or is followed up according to the drifting point of action of the cutter.

In a preferred embodiment of this invention, the axis of rotation of the milling cutter 10 is controlled by a computer numerical controller.

As is known to those skilled in the art, computer numerical control is a control system in which numerical values corresponding to desired tool or control positions are generated by. This system is often frequently referred to as "computational numerical control", "soft-wired numerical control," and/or "stored-program numerical control".

The CNC control systems known to those skilled in the art may be used as CNC controller 16. Thus, by way of illustration and not limitation, one may use the CNC devices disclosed in U.S. Pat. Nos. 5,373,222, 5,331,811, 5,315,071 (CNC controller), U.S. Pat. Nos. 5,305,226, 5,304,909, 5,291,391 (CNC controller), U.S. Pat. Nos. 5,272,423, 5,268,554, 5,257,178 (CNC milling machine), U.S. Pat. No.

5,241,798 (CNC grinding machine), U.S. Pat. No. 5,239,901 (CNC lathe), U.S. Pat. Nos. 5,148,637, 5,136,527, 5,115,172, 4,606,001, 4,513,379, 4,314,i29, 4,199,814 (CNC machine tool), U.S. Pat. Nos. 4,149,235, 4,087,808, and the like. The disclosure of each of these United States patents is hereby incorporated by reference into this specification.

Referring again to FIG. 1, it will be seen that the wheelset (not shown) to which wheel 12 is attached is rotating counterclockwise in the direction of arrow 18. The wheelset (not shown) is preferably located in wheelset centering means (not shown) which are driven positively or non-positively.

These centering means may include center points as well as friction and/or supporting rollers, as is illustrated in the underfloor wheelset turning machines discussed elsewhere in this specification.

When the milling cutter 10 is in the position 20 depicted in FIG. 1, CNC controller 16 causes it to rotate clockwise in the direction of arrow 22. Millng cutter 10 is comprised of edge crown 25. The profile areas 26 and/or 28 may be machined with the sense of rotation 22 of milling cutter 10 in a continuous path control mode. At the vertex 30 of wheel 12, conventional milling may be changed to climb milling. When the change is made to climb milling, the direction of chip fly is changed also.

Climb milling, also known as climb cutting, down cutting, and down milling, is a milling technique in which the teeth of a cutting tool advance into the work in the same direction as the feed. See, e.g., U.S. Pat. Nos. 5,373,708 and 5,193,944, the disclosure of each of which is hereby incorporated by reference into this specification.

In another embodiment, profile area 26 is machined with climb milling and profile area 28 is machined with conventional milling by reversing the sense of rotation of either wheel 12 and/or milling cutter 10.

Referring again to FIG. 1, the milling cutter 10 is guided by CNC controller 16 in axial 34 and radial 36 directions to effect axially perpendicular form mill turning. Machining of the end faces of wheel 12 is also possible.

Referring again to FIG. 1, and in the preferred embodiment depicted therein, it will be seen that the milling cutter is comprised of at least two edge crowns. The term "edge crown", as used in this specification, refers to the cutting inserts and/or cutting tips commonly used for milling cutters.

By way of illustration and not limitation, the edge crowns used may be one or more of the cutting inserts disclosed in U.S. Pat. No. 5,388,932 (cutting insert for milling cutter), U.S. Pat. No. 5,332,338 (cutting insert for rotary milling cutter), U.S. Pat. Nos. 5,232,319, 5,209,610 (wiper cutting insert), U.S. Pat. No. 5,207,538 (cutting insert for peripheral rotary milling cutter), U.S. Pat. No. 5,201,613 (single point adjustable cutter insert), U.S. Pat. Nos. 5,199,827, 5,188,489 (coated indexable cutter insert), U.S. Pat. No. 5,158,402 (cutter insert for rotary milling cutter), U.S. Pat. Nos. 5,145,295, 5,071,292, 5,052,863, 4,341,493, 4,090,801, 3,975,809, 3,535,759 (milling cutter with adjustable cutting insert tips), D351,506, D348,891, D344,276, D341,604, and the like. The disclosure of each of these United States patents is hereby incorporated by reference into this specification.

Thus, by way of further illustration and not limitation, the edge crown(s) used may be one or more of the cutting tips disclosed in U.S. Pat. No. 3,666,321. The entire disclosure of this United States patent is hereby incorporated by reference into this specification.

The cutting inserts/cutting tips can have various geometrical shapes. Thus, e.g., they may be substantially round, substantially square, substantially rectangular, and the like.

Referring again to FIG. 1, and in the preferred embodiment illustrated therein, edge crown 24 may be in the form of a cutter button such as, e.g., the cutter buttons disclosed is U.S. Pat. Nos. 3,540,103, the entire disclosure of which is hereby incorporated by reference into this specification.

The cutter buttons of this patent are rigidly associated with a cutting body of substantially circular cross-section. In one embodiment, the longitudinal axes of at least a portion of such cutter buttons are substantially coincident with the radii of the cutter body. In another embodiment, the longitudinal axis of at, least a portion of said cutter buttons are disposed within 15 degrees of coincidence with the radii of the cutter body.

In one preferred embodiment, the edge crown 24 consists essentially of abrasive grains. Thus, by way of illustration and not limitation, edge crown may consist essentially of tungsten carbide, boron carbide, alumina, diamond, cubic boron nitride, titanium nitride, titanium carbide, and the like. See, e.g., U.S. Pat. Nos. 5,210,908, 5,308,367, 5,331,769, 5,365,986, 5,370,944, and the like. The disclosure of each of these United States patents is hereby incorporated by reference into this specification.

In one embodiment, edge crown 24 has a smoothly rounded tip which, preferably, has an arcuate shape and consists essentially of a metal carbide material. See, e.g., U.S. Pat. Nos. 5,295,421, the disclosure of which is hereby incorporated by reference into this specification.

In one embodiment, indexable cutting tips are used. Thus, e.g., one may use the cutters described in U.S. Pat. No. 5,382,118 (indexable cutting edges for a milling insert), U.S. Pat. No. 5,368,418 (indexable cutting insert), 5,366,325 (insert with two indexable high cutting points), U.S. Pat. Nos. 5,330,295, 5,322,399 (indexable carbide cutting inserts), U.S. Pat. No. 5,282,703 (indexable cutter insert), U.S. Pat. No. 5,236,288 (round indexable cutting inserts), U.S. Pat. No. 5,221,164 (indexable cutting insert with sinusoidal edge), U.S. Pat. No. 5,203,649 (indexable cutting insert with concave/convex cutting edge), U.S. Pat. No. 5,145,294 (round indexable cutting insert), and the like. The disclosure of each of these United States patents is hereby incorporated by reference into this specification.

As will be apparent to those skilled in the art, and referring to FIGS. 1 and 2, during the axially perpendicular profile mill turning illustrated in FIG. 1, either the sense of rotation or the cutting direction of edge crowns 24 and 25 will be opposite to each other. By comparison, during the axially parallel profile mill turning illustrated in FIG. 2, both the sense of rotation and the cutting direction of edge crowns 42 and 44 will be equal to each other.

Referring again to FIG. 1, and in the preferred embodiment depicted, edge crowns 24 and 25 with cutting directions preferably opposite to each other are attached to milling cutter 10. Profile area 26 is machined by means of edge crown 24, the milling cutter running in sense of direction 22. Profile area 27 is then machined by means of edge crown 25, the milling cutter running in the sense of direction 23. Thus, the same direction of fly chip can be obtained. As will be apparent to those skilled in the art, the chip fly direction depends on the sense of rotation of the milling cutter 10.

FIG. 2 is a schematic diagram illustrating the machining of wheel 12 by means of a disk-shaped milling cutter 38 applying the axially parallel form mill-turning process without the need for storing the profile of wheel 12 on cutter 38. The milling cutter 38 is also operatively connected to and guided by CNC controller 16. When the profile area 40 is being machined, the profile is made up to the wheel flange crest 30 by means of the first edge crown 42. Thereafter, the remaining profile area 28 can be machined by means of the second edge crown 44. It is preferred, when utilizing this process, to maintain a constant direction of chip fly. The machining can be conducted with conventional milling or climb milling utilizing sense of rotation 18, sense of rotation 46, and/or opposing sense(s) of rotation.

Figure 3:
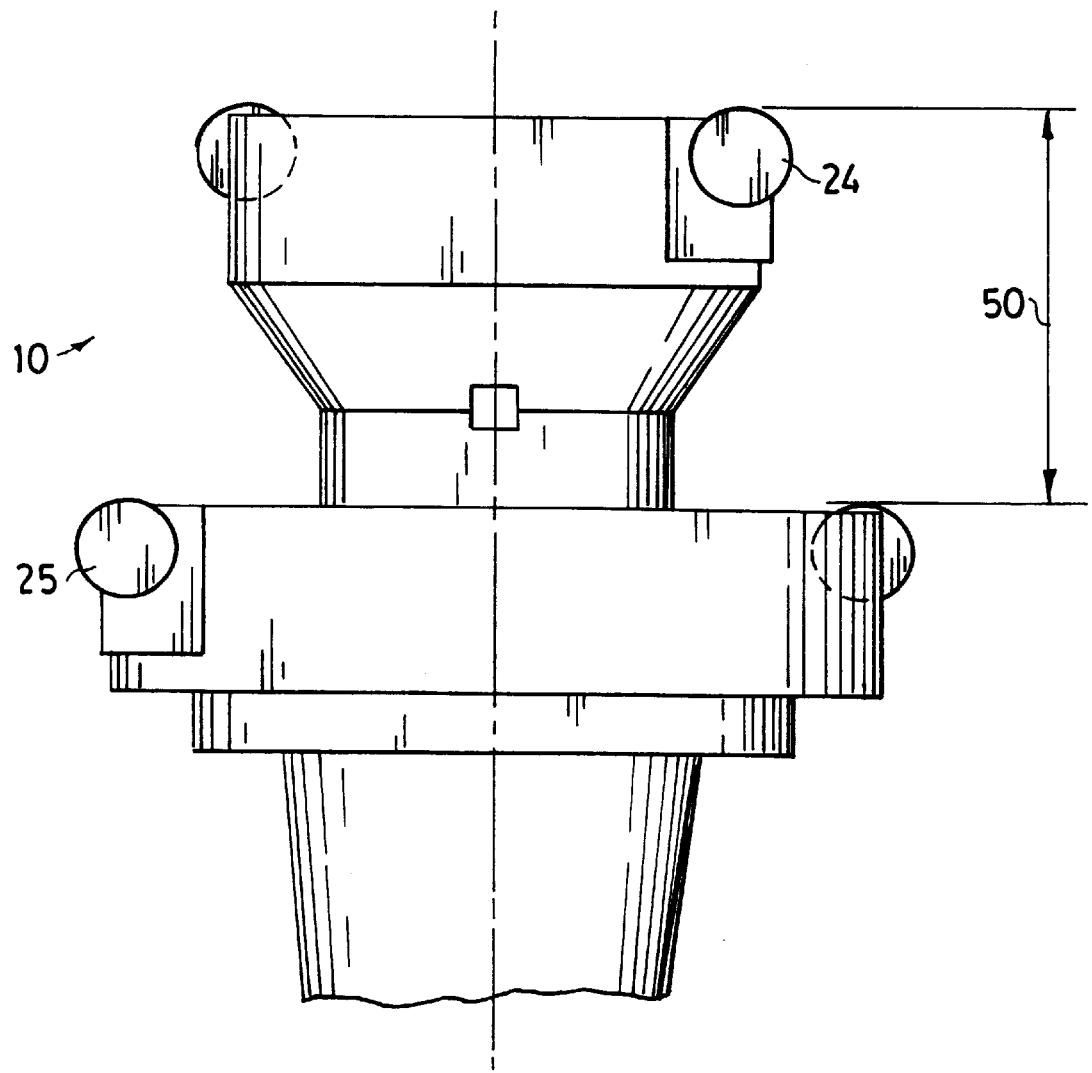
FIG. 3 is a front view of the milling cutter depicted in the embodiment of FIG. 1.

FIG. 3 illustrates a milling cutter 10 equipped with two edge crowns. The first edge crown 24 is arranged in opposite cutting direction to the second edge crown 25; this design retains equal direction of chip fly during the milling process with high efficiency and long tool life.

The edge crowns 24 and 25 are disposed on milling cutter 10 at different locations and are separated from each other by a specified height so that, while edge crown 24 is contacting a portion of the wheel to be ground, edge crown 25 will not necessarily also contact such wheel.

In the preferred embodiment depicted in FIG. 3, the distance 50 between edge crown 24 and edge crown 25 is preferably equal to the wheel flange height (not shown) plus the wear on wheel 12 (not shown) plus the safety clearance (not shown). The diameter of the edge crowns is preferably equal to the safety clearance (not shown) plus one-half of the wheel flange thickness.

In the preferred embodiment illustrated in FIG. 3, at least one, and preferably both, of edge crowns 24 and 25 has a cutting edge profile which is substantially arcuate and is defined by a radius which is equal to or smaller than the smallest concave radius in the wheel profile to be generated.

FIG. 4 illustrates a milling cutter 52 which has a plunge-cut mill-turning cutter and axially parallel form mill-turning cutter sections. The running tread profile stored in the edge crowns 54 is adapted to machine the profile area 26 according to the plunge-cut profile mill-turning process. The crown of indexable tips 56 is used for the chamfer 58 and for profile area 60. The edge crown 62 is used for profile area 64. Conventional milling will be obtained from the sense of rotation 18 of the wheel 12, and from the sense of rotation 66 of milling cutter 52. Climb milling will also be possible when reversing the sense of rotation of wheel 12 or cutter 52.

The direction of chip fly depends only upon the sense of rotation of milling cutter 52. Feed direction 34 is used for plunge-cut profile mill-turning; and feed directions 34 and 36 are used for continuous path controlled form mill-turning.

Figure 5:
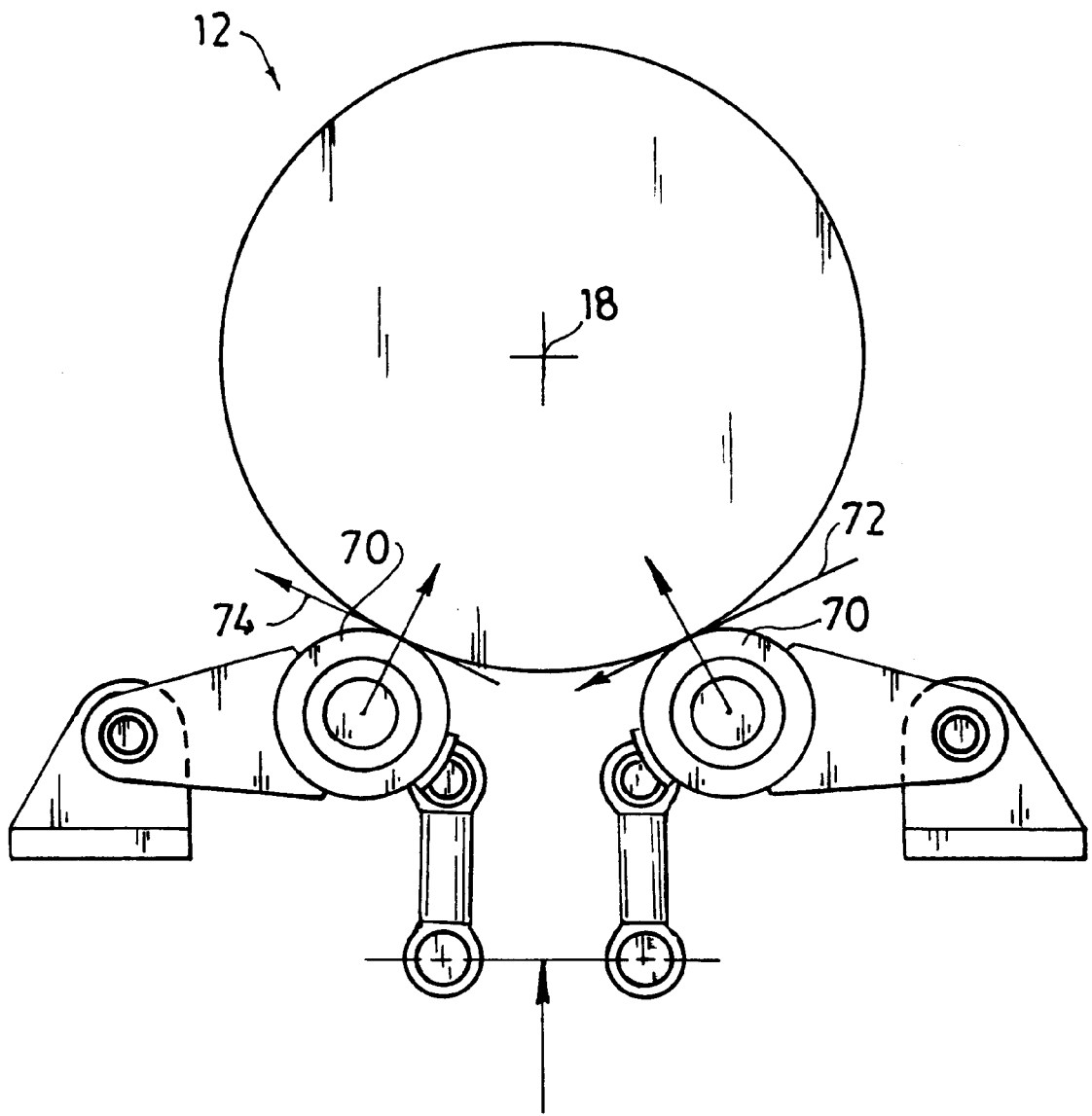
FIG. 5 is a schematic representation of driven friction roller means for rotating a wheel or wheelset.

FIG. 5 is a schematic representation of one means of rotating a wheel 12 by means of rollers 70. Referring to FIG. 5, it will be seen that rollers 70 are driven by means not shown so that, in the embodiment depicted, wheel 12 rotates in the direction of arrows 72 and 74 about axis 18.

FIG. 5 illustrates one of several means of driving friction rollers. Thus, by way of further illustration, one may use the driven friction roller devices described in one or more of U.S. Pat. No. 5,538,483 (friction roller transmission), U.S. Pat. Nos. 5,464,375, 5,443,359 (friction roller torqued by a magnetic hysteresis device), U.S. Pat. Nos. 5,441,207, 5,415,055 (driven friction roller), U.S. Pat. Nos. 5,400,919, 5,348,238 (motor driven friction roller), U.S. Pat. Nos. 5,267,920, 4,901,845 (friction roller conveyor), U.S. Pat. No. 4,120,072, and the like. The disclosure of each of these United States patents is hereby incorporated by reference into this specification.

As will be apparent to those skilled in the art, because the power transmission takes place by friction rollers, no fixed clamping of the workpiece is required, and turnmilling takes place with lower cutting forces and lower manifold torque.

Furthermore, in the embodiment where two rows of cutting inserts are used, the milling cutter has a relatively high rigidity, allowing one to use different materials for the cutting inserts. Thus, e.g., one can use one row of inserts for a hard running tread, and one row of inserts for cutting of soft wheel flanges. Other such arrangements will be apparent to those skilled in the art.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. An apparatus for profiling a wheelset of railroad vehicles comprised of a milling cutter, wherein said milling cutter is comprised of a body with a first axis of rotation, and wherein:

(a) said apparatus is comprised of means for rotating said wheelset about a second axis of rotation which comprise driven friction rollers, (b) said apparatus is comprised of computer numerical control means for rotating said milling cutter about said first axis of rotation while disposing said milling cutter so that said first axis of rotation is substantially perpendicular to said second axis of rotation, (c) said milling cutter is comprised of a body with a first edge crown attached to a first portion of said body at a first distance away from said first axis of rotation, and a second edge crown attached to a second portion of said body at a second distance away from said first axis of rotation, and (d) said first edge crown is attached in a first cutting direction, said second edge crown is attached in a second cutting direction, and said second cutting direction is opposite to said first cutting direction.

2. The apparatus as recited in claim 1, wherein said apparatus is comprised of a third edge crown attached to a third portion of said body at a third distance away from said first axis of rotation, and a fourth edge crown attached to a fourth portion of said body at a fourth distance away from said first axis of rotations wherein:

(a) said first distance is equal to said third distance, said second distance is equal to said fourth distance, and said second distance is greater than said first distance; aligned with said second edge crown, (b) said third edge crown is attached in a third cutting direction, said fourth edge crown is attached in a fourth cutting direction, and said third cutting direction is opposite to said fourth cutting direction.

3. The apparatus as recited in claim 2, wherein said apparatus is comprised of means for rotating said milling cutter in a clockwise direction about said first axis of rotation.

4. The apparatus as recited in claim 3, wherein said apparatus is comprised of means for rotating said milling cutter in a counter-clockwise direction about said first axis of rotation.

5. The apparatus as recited in claim 4, wherein said first edge crown is fitted with indexable tips.

6. The apparatus as recited in claim 5, wherein said second edge crown is fitted with indexable tips.

7. The apparatus as recited in claim 6, wherein said indexable tips are rounded carbide tips.

8. A process for stock-removal profiling of wheelsets of railroad vehicles with an apparatus for profiling a wheelset of railroad vehicles comprising a milling cutter, comprising the steps of:
- (a) rotating said milling cutter about a first axis of rotation, wherein said milling cutter is comprised of a body with said first axis of rotation,
- (b) disposing said wheelset with said second axis of rotation so that said second axis of rotation is substantially perpendicular to said first axis of rotation while simultaneously rotating said wheelset by means comprising driven friction rollers and contacting said rotating wheelset with said rotating milling cutter, wherein:
  1. said milling cutter is comprised of a body with a first edge crown attached to a first portion of said body at a first distance away from said first axis of rotation, and a second edge crown attached to a second portion of said body at a second distance away from said first axis of rotation, and
  2. said first edge crown is attached in a first cutting direction, said second edge crown is attached in a second cutting direction, and said second cutting direction is opposite to said first cutting direction.

9. The process as recited in claim 8, wherein said apparatus is comprised of a third edge crown attached to a third portion of said body at a third distance away from said first axis of rotation, and a fourth edge crown attached to a fourth portion of said body at a fourth distance away from said first axis of rotation, wherein:
- (a) said first distance is equal to said third distance, said second distance is equal to said fourth distance, and said second distance is greater than said first distance; aligned with said second edge crown,
- (b) said third edge crown is attached in a third cutting direction, said fourth edge crown is attached in a fourth cutting direction, and said third cutting direction is opposite to said fourth cutting direction.

10. The process as recited in claim 9, wherein said apparatus is comprised of means for rotating said milling cutter in a clockwise direction about said first axis of rotation.

11. The process as recited in claim 10, wherein said apparatus is comprised of means for rotating said milling cutter in a counter-clockwise direction about said first axis of rotation.

12. The process as recited in claim 11, wherein said first edge crown is fitted with indexable tips.

13. The process as recited in claim 12, wherein said second edge crown is fitted with indexable tips.

14. The process as recited in claim 13, wherein said indexable tips are rounded carbide tips.

\* \* \* \* \*